United States Patent
Rous

[19]

[11] Patent Number: 5,940,295
[45] Date of Patent: Aug. 17, 1999

[54] DISTRIBUTED EXECUTION PROCESS FOR AN INTERACTIVE MULTIMEDIA PROGRAM, AND A LOCAL STATION USING THIS METHOD

[75] Inventor: Jozef H. G. Rous, Eindhoven, Netherlands

[73] Assignee: U.S. Philips Corporation, New York, N.Y.

[21] Appl. No.: 08/888,355

[22] Filed: Jul. 3, 1997

Related U.S. Application Data

[63] Continuation of application No. 08/394,975, Feb. 27, 1995, abandoned.

[30] Foreign Application Priority Data

May 16, 1994 [EP] European Pat. Off. .............. 94201374

[51] Int. Cl.⁶ ..................................................... G05B 9/02
[52] U.S. Cl. ..................... 364/188; 395/200.31; 345/326
[58] Field of Search .................... 364/188–189; 395/200, 600, 200.31, 200.34, 200.35, 200.36, 200.38, 200.39, 200.4, 200.41; 348/6–8, 10–13, 14–17; 379/93–98, 100–105; 358/86; 345/302, 326–331

[56] References Cited

U.S. PATENT DOCUMENTS

| | | | |
|---|---|---|---|
| 5,179,660 | 1/1993 | Devany et al. | 395/200 |
| 5,208,665 | 5/1993 | McCalley et al. | 358/46 |
| 5,454,722 | 10/1995 | Holland et al. | 434/271 |
| 5,464,946 | 11/1995 | Lewis | 84/609 |
| 5,528,281 | 6/1996 | Grady et al. | 348/7 |
| 5,721,878 | 2/1998 | Ottesen et al. | 348/7 |

FOREIGN PATENT DOCUMENTS

| | | | |
|---|---|---|---|
| 5166352 | 7/1993 | Japan | G11B 33/02 |
| 9204670 | 3/1992 | WIPO | G06F 1/00 |

OTHER PUBLICATIONS

Preston, "Compact Disc–Interactive A Designer's Overview", Kluwer Technical Books, Deventer, the Netherlands, 1988, pp. 133–140.

*Primary Examiner*—Reba I. Elmore
*Assistant Examiner*—Thomas E. Brown
*Attorney, Agent, or Firm*—David R. Treacy; Gregory L. Thorne

[57] ABSTRACT

A method for the distributed execution of an interactive multimedia program in which the interaction with the user takes place via a local station and the actual execution takes place in a powerful central station. To this end, user commands to be executed are applied from the local station to the central station and the presentation commands generated by said execution are applied from the central station to the local station. The audiovisual data presented to the user is locally stored and is not transported via the connection. Consequently, the connection requires only a small bandwidth.

20 Claims, 3 Drawing Sheets

DISTRIBUTED EXECUTION PROCESS FOR AN INTERACTIVE MULTIMEDIA PROGRAM, AND A LOCAL STATION USING THIS METHOD

This is a continuation division of application Ser. No. 08/394,975, filed Feb. 27, 1995, now abandoned.

BACKGROUND OF THE INVENTION

The invention relates to a method for the distributed execution of an interactive multimedia program, comprising:

- the interpretion of user signals received in a local station and conversion of these signals into user commands,
- the execution of the user commands in an application program, thus generating presentation commands,
- the selection and fetching audiovisual data from a local mass memory by means of the presentation commands, and
- the presentation of the audiovisual data on local reproduction means.

The invention also relates to an apparatus which, when suitably programmed, is suitable for use as the local station according to the described method.

An interactive multimedia program comprises two important elements which have a major effect on the degree of suitability of equipment for executing such a program. The first element is the interactive aspect. This means that during the execution of a program a user of the program issues given commands by means of the control means, and that the consequences of these commands are presented to the user almost immediately. The second important element concerns the multimedia aspect. This means that the program response is not only in the form of textual messages but especially also in the form of images and sound.

An example of a station suitable for the execution of an interactive multimedia program is a CD-i player. The architecture of a CD-i player is described on pages 133–140 of "Compact Disc-Interactive: A Designer's Overview", J. M. Preston, Kluwer Technical Books, Deventer, the Netherlands, 1988. A CD-i player is a consumer product and inter alia because of that it has a limited working memory and a limited program execution capacity. It is difficult or even impossible to execute extensive programs requiring intensive calculations, by means of a CD-i player.

In the professional computer environment a more or less comparable problem has arisen in respect of the use of workstations, being local computers available to one user. The local workstation is not suitable to execute large programs sufficiently quickly. In that environment this problem is solved by connecting the workstation to a powerful central computer which performs a number of tasks for the workstation. The connection between the workstation and the central computer has a large bandwidth in order to transport the data to the workstation without confronting the user of the workstation with an annoying delay. Notably because of the large bandwidth required for the connection, this solution is not suitable for use in the consumer environment where, moreover, the local station and the central station will usually be very remote from one another.

SUMMARY OF THE INVENTION

It is inter alia an object of the invention to enable the user of a multimedia station of the kind set forth to execute large programs without necessitating an increase of the program execution capacity of the local station. To achieve this, in conformity with one of its aspects the invention provides a method which is characterized in that the execution of the user commands takes place in a central station, for which purpose:

- the user commands are applied from the local station to a central station, and
- the presentation commands generated in the central station are dispatched to the local station in order to execute said selection and presentation.

The advantage of the invention is twofold. On the one hand, the local station does not require an increased memory or processing capacity, because processing capacity of the central computer is used; on the other hand, this is achieved in a manner which does not impose severe requirements as regards the bandwidth of the connection between the local station and the central station. The use of a connection of small bandwidth is possible because only commands are exchanged in the method in accordance with the invention. The audiovisual data is locally stored in the mass memory of the local station and is, therefore, not transported via the connection.

An apparatus which, when suitably programmed, is suitable for use as the local station in the method in accordance with the invention comprises:

- local reproduction means for presentation of the audiovisual data,
- a local mass memory for the storage of audiovisual data,
- connection means for connecting the local station to a central station,
- control means for generating user signals,
- means for interpreting the user signals and for converting these signals into user commands,
- means for dispatching the user commands via the connection means and for receiving presentation commands formed in the central station,
- means for selecting and fetching audiovisual data from the local mass memory on the basis of the presentation commands,
- means for presenting the audiovisual data on the local reproduction means,
- coupling means for functionally coupling the local reproduction means, the connection means, the local mass memory, the control means and the other means.

A preferred embodiment of the invention will be described in detail hereinafter, by way of example, with reference to the accompanying drawings.

BRIEF DESCRIPTION OF THE DRAWINGS

Corresponding reference numerals in the Figures denote corresponding elements.

DESCRIPTION OF THE PREFERRED EMBODIMENT

Figure 1:
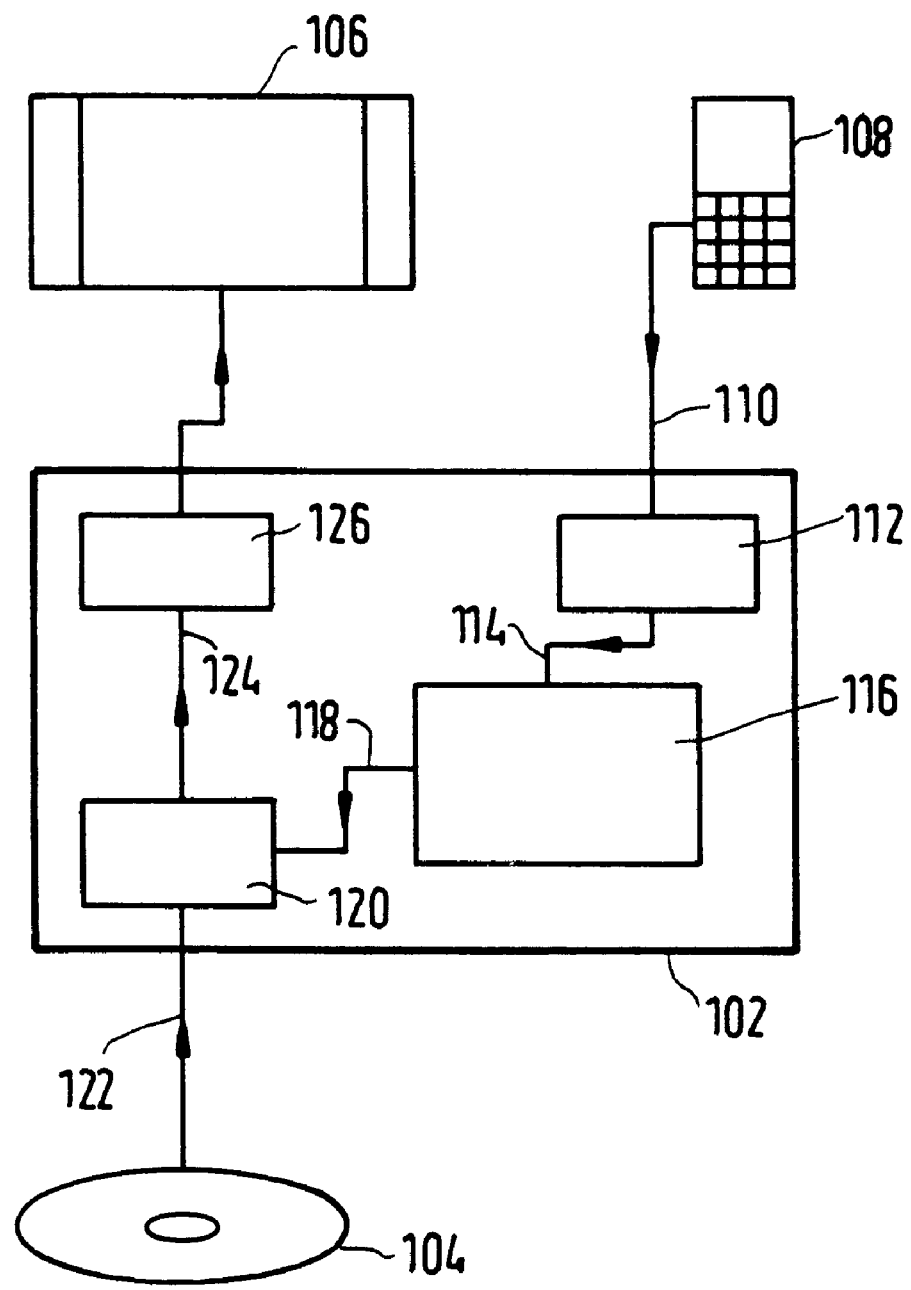
FIG. 1 shows diagrammatically a number of elements of a CD-i player.

FIG. 1 shows diagrammatically a number of elements of a CD-i player. The CD-i player comprises a system unit 102, a removable optical disc 104 which serves as the local mass memory for audiovisual data, local reproduction means 106 for the presentation of the audiovisual data, and a control means 108 enabling the user to enter instructions. The local reproduction means 106 are usually formed by a television set with associated loudspeakers, but may also consist of a monitor and separate loudspeaker boxes or a monitor and a headphone. The control means 108 may be constructed as a remote control with cursor facility, as a keyboard which is connected to the system unit via a cable, or as both.

A CD-i player comprises a processor of the Motorola 68000 family which executes instructions at a frequency of at least 8 MHz, and a 1-Mbyte working memory. During execution of a program the working memory is used inter alia for the storage of the relevant program instructions, for the storage of sound effects, and for the storage of images. The optical disc unit of a CD-i player is suitable for optical discs having a storage capacity of 650 Mbytes and can read disc information at a maximum speed of 170 kbytes per second.

The connections between the components in FIG. 1, denoted by the reference numerals 110, 114, 118, 122 and 124, represent signal paths rather than the physical connections between the respective components. The references 112, 116, 120 and 126 represent parts of a program executed on appropriate hardware. During execution of a program in the CD-i player, the user signals 110 are received in he player and interpreted in an appropriate element 112. An example of a user signal 110 is the output signal of a mouse. The user signals are interpreted and converted into user commands 114 to be executed. An example of a user command 114 is the depression of a given key displayed on the local display screen. At that area of the local display screen a key has then been inserted before that and, therefore, a mouse click (user signal) in that location is interpreted as a key selection (user command).

A user command 114 is executed by an application program section 116 and will ultimately result in a given response to the user. To this end, a presentation command 118 is generated in which it is accurately described, for example by way of an address or other identification, which information is to be fetched from the optical disc 104 so as to be presented to the user. An example of a presentation command is the instruction to place a given photograph on the local display screen. For the execution of a presentation command 118, the component 120 fetches the required audiovisual data 122 from the optical disc 104. If necessary, the audiovisual data is adapted; for example, a given section is taken from a photograph. To this end, the component 120 fetches the entire photograph from the optical disc and retrieves a part therefrom. Other examples of presentation commands are: a command to play a given audio segment of the optical disc for a given period of time, and a command to fetch a given photograph and to display it with a fade-in of a given duration. The possibly adapted audiovisual data 124 is applied to the component 126 which presents this data on the local reproduction means 106.

Another example of the above type of command is the clicking on a door of a house shown on the local display screen; in a given application program, this results in a photograph of the interior of a hallway being shown as if the user has entered the house. In the present example the user signal is formed by the depression of a key of the mouse while the cursor is at the position of the door, the user command is the opening of the door, and the presentation command is the instruction to fetch and reproduce the photograph of the interior of the hallway. Another example is the clicking on of a musical instrument from a number of musical instruments shown on the screen in a given application program, after which a given musical tune is played by means of the relevant instrument. In the present example the user signal is formed by the depression of the mouse key while the cursor is in the position of the relevant musical instrument, the user command being the selection of the relevant instrument, and the presentation command being the instruction to fetch and reproduce the relevant audio information.

Figure 2:
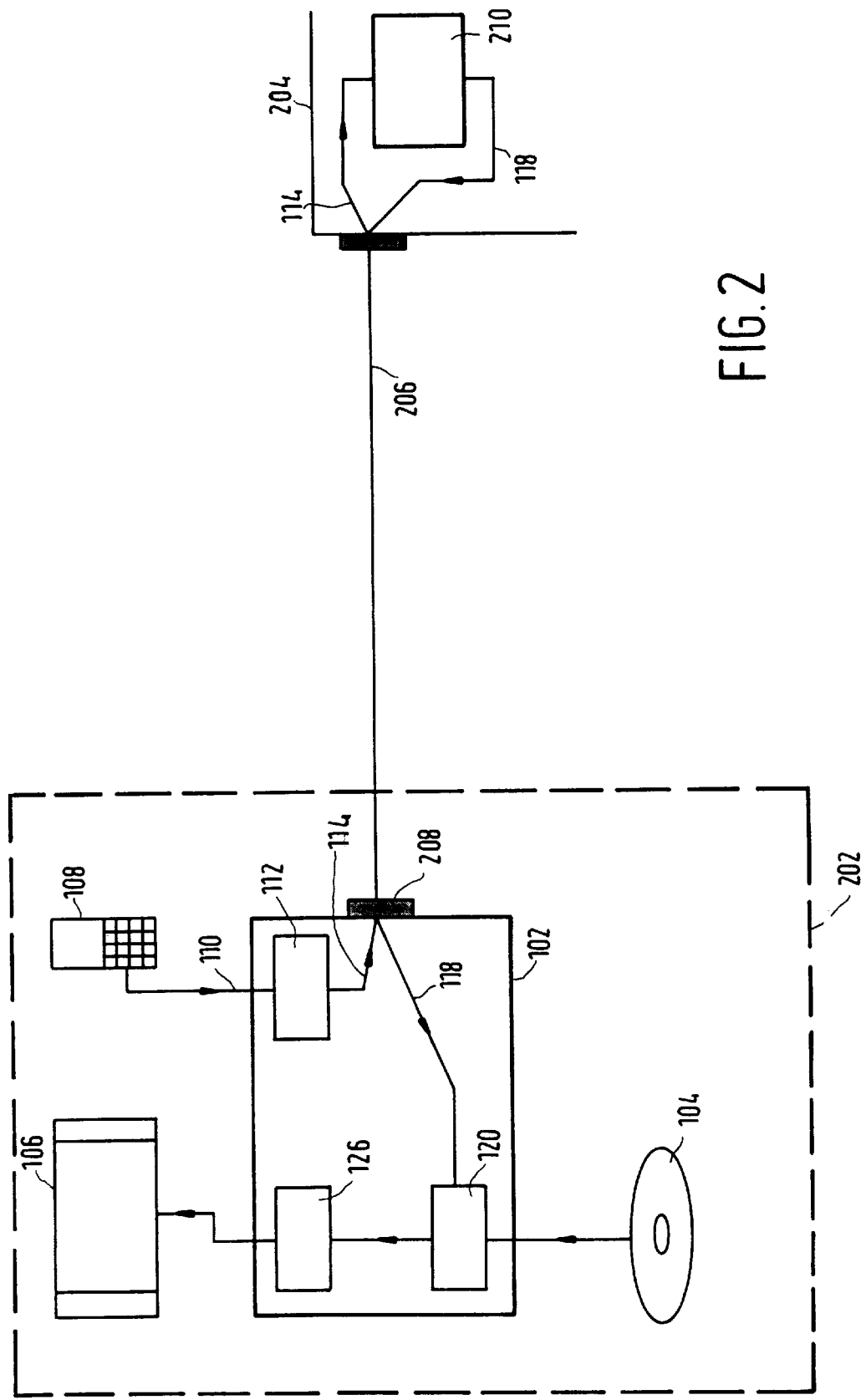
FIG. 2 illustrates the method of the invention, used in conjunction with a CD-i player.

FIG. 2 shows the method of executing a program in accordance with the invention. The local station 202 is formed by a CD-i player which comprises a system unit 102, an optical disc 104 and local reproduction means 106 which are all present at a given location. A central station 204 is present at another location and a connection 206 exists between the local station and the central station. During the execution of a program, the user signals 110 are then received in the CD-i player and interpreted in the appropriate component 112, the signals being converted into user commands 114 to be executed.

The user commands 114 are transported, via a connection means 208, for example a modem, and the connection 206, to the central station 204 in which they are executed. The execution of the user commands now takes place in the application program section 210 whose task is similar to that of the original application program section 116; however, it is run in a central station which is more powerful than the local station. Because of the invention, the user commands which previously resulted in an unacceptably long response time for the user because of the necessary internal processing, can now be executed within an acceptable period of time. A simple example in this respect is a chess program which is capable of evaluating more positions when the execution segment is run on a powerful central station. The execution of user commands 114 results in presentation commands 118 which are transported to the local station via the connection 206. Once they have reached the local station, the presentation commands are executed in the same way as before. The component 120 fetches the required audiovisual data from the optical disc 104 and adapts this data, if necessary. The component 126 subsequently presents the audiovisual data, adapted or not, on the local reproduction means 106.

In a method in accordance with the invention, an application program is divided into two parts. A first part is run on the local station and is loaded therein from, for example the optical disc and provides the contacts between the user and the application. This involves the reception and interpretation of user signals and the presentation of data to the user. The second part of the application program is run on the central machine so that it is possible to execute complex and arithmetically intensive tasks within a period of time which is acceptable to the user. Furthermore, for the execution of user commands the application program can thus utilize information available in the central station, for example from an expert system. According to a method of the invention, the executive part of the application program is not present in the local station used by the user, but is run on a central station in a different location. This means that the dispatch of user commands to be centrally executed via the connection is of essential importance to the progress of the application program.

An example of an application program for use of the method of the invention is formed by a learning system which in one of its versions allows the user to learn the Dutch language. A program section of this learning system contains knowledge of the language taught via the system. To this end, the program comprises many program instructions and data and, consequently, is too large to be executed in the comparatively small memory of a CD-i player so that it is still acceptable to the user.

According to a method of the invention, utilizing a CD-i player, audiovisual data is stored on the optical disc 104 of the CD-i layer. This data is read from the disc at a maximum speed of approximately 170 kbytes per second, enabling a sufficiently fast presentation to the user. The presentation commands, formed in the central station, are applied to the CD-i player via the connection 206. Because of their nature, these presentation commands contain substantially fewer data (in bytes) than the audiovisual data from the optical disc. Consequently, in a given embodiment the connection can be realised by way of a simple, public telephone line which is connected to the CD-i player via a simple modem. A maximum speed of approximately 300 bytes per second suffices to transport the presentation commands from the central station to the CD-i player within a period of time which is acceptable to the user. The calculations in the above example indicate that the maximum speed of the data transfer from the optical disc is at least two orders higher than the maximum speed of the data transfer on the connection.

Figure 3:
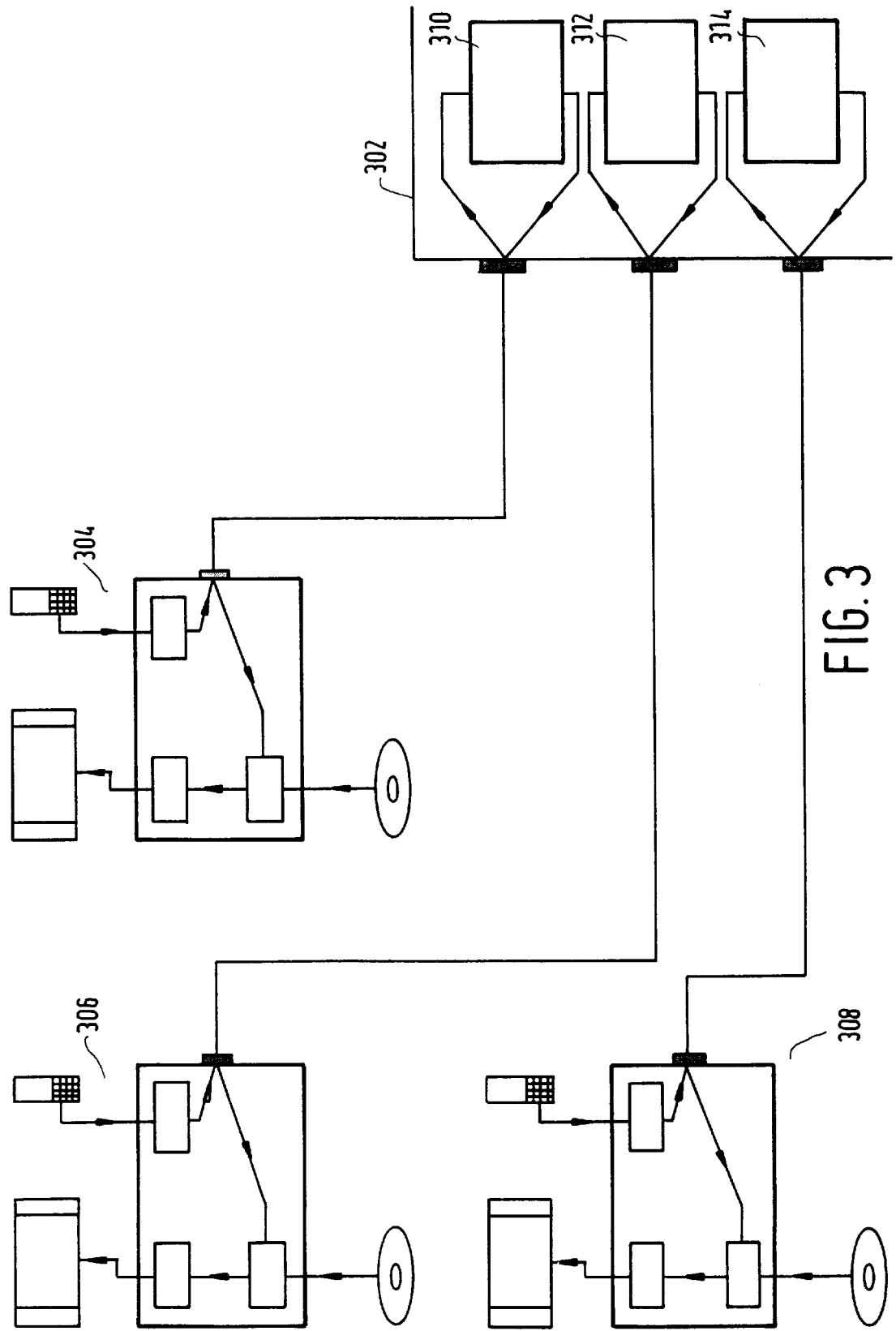
FIG. 3 shows the application of the method in accordance with the invention while using 3 local stations.

FIG. 3 shows an application of the method of the invention in which 3 local stations are connected to one central station. If the central station 302 is sufficiently powerful, a program section for the execution of user commands for a connected local station will not utilize the full capacity of the central station. In that case several stations, denoted by the reference numerals 304, 306 and 308 in the Figure, can be connected and the respective commands can be executed quasi-simultaneously by the program sections 310, 312 and 314. The number of 3 stations in the Figure is meant merely as an example to illustrate the principle. Other numbers can be readily used, the numbers being determined in practice by the capacity required by the program sections in relation to the overall available capacity of the central machine.

The invention has been described with reference to a method utilizing a local station in the form of a CD-i player. However, the invention is by no means restricted thereto and can also be used for other multimedia stations.

I claim:

1. A method for distributed execution of an interactive multimedia program, the method comprising the steps of:
   a) receiving, in a local station having a limited computational capability, user signals;
   b) converting, in the local station, the user signals into user commands;
   c) transporting the user commands to a central station;
   d) executing the user commands, requiring a computational capability exceeding that of the local station, according to an application program in a section of the central station, to produce presentation commands;
   e) transporting the presentation commands to the local station;
   f) responsive solely to the presentation commands transported from the central station, executing the presentation commands in the local station, this executing step further comprising:
      fetching required audiovisual data from a mass memory in the local station, and
      presenting audiovisual data on local reproduction means.

2. A method as claimed in claim 1, characterized in that the presenting step further includes adapting the fetched audiovisual data responsive solely to the presentation commands transported from the central station.

3. A method as claimed in claim 1, further comprising:
   receiving, in the central station, other user commands from an other local station;
   executing the other user commands in the application program section of the central station, to produce other presentation commands; and
   transporting the other presentation commands to the other local station.

4. A method as claimed in claim 1, wherein the fetching step uses a data stream from the mass memory in the local station, said data stream having a maximum speed at least two orders higher than the maximum speed of data stream transport of the presentation commands from the central station.

5. A method as claimed in claim 4, wherein the transporting step is performed using a public telephone line connection between the local station and the central station.

6. A method as claimed in claim 4, characterized in that the presenting step in said local station further includes adapting the fetched audiovisual data responsive solely to the presentation commands transported from the central station.

7. An apparatus for use as a local station, said apparatus comprising:
   a local mass memory resident in the local station for storage of data;
   local reproduction means resident in the local station for presentation of data fetched from said local mass memory;
   control means for generating user signals;
   means, having a limited computational capability, for interpreting the user signals in accordance with a stored program and for converting the user signals into user commands;
   means for transmitting the user commands to a central station, and for receiving presentation commands derived from said user commands as a result of extensive computation, from the central station;
   means, responsive solely to said presentation commands in accordance with said stored program, for selecting and fetching data from the local mass memory; and
   means for presenting the fetched data on the local reproduction means.

8. An apparatus as claimed in claim 7, wherein said means for fetching data from the local mass memory has a maximum speed of data transfer at least two orders of magnitude higher than said means for transmitting and receiving.

9. An apparatus as claimed in claim 7, wherein said means for selecting and fetching data includes means for adapting fetched data responsive, in accordance with said stored program, solely to said presentation commands.

10. An apparatus as claimed in claim 7, wherein said local mass memory stores audiovisual data, and said local reproduction means produces an audiovisual presentation.

11. An apparatus as claimed in claim 7, wherein said apparatus is formed as a CD-i player.

12. An apparatus as claimed in claim 11, wherein said means for fetching data from the local mass memory has a maximum speed of data transfer at least two orders of magnitude higher than said means for transmitting and receiving.

13. An apparatus as claimed in claim 12, wherein said means for selecting and fetching data includes means for adapting fetched data responsive, in accordance with said stored program, solely to said presentation commands.

14. A system for distributed execution of an interactive program, said system comprising:
- a central station having powerful computational capability,
- a local station having limited computational capability, and
- means for transporting user commands from the local station to the central station, and presentation commands from the central station to the local station, said local station comprising:
- a local mass memory for storing data used during execution of the program;
- means for receiving user signals relating to said program and for interpreting the user signals into said user commands, and
- means, responsive solely to the presentation commands transported from the central station in accordance with said stored program, for fetching data from said local mass memory and utilizing the fetched data during execution of the program, and said central station comprising:
- means, responsive to an application program in a section of the central station, requiring a computational capability exceeding that of the local station, for executing the user commands transported from the local station, and for generating presentation commands in accordance with said application program.

15. A system as claimed in claim 14, wherein said means for transporting comprises a public telephone line.

16. A system as claimed in claim 14, wherein said means for fetching data from said local mass memory has a maximum speed of data transfer at least two orders of magnitude higher than the maximum speed of data transfer of said means for transporting.

17. A system as claimed in claim 16, wherein said means for fetching and utilizing adapt the fetched data responsive solely to said presentation commands.

18. A system as claimed in claim 17, further comprising:
- a plurality of other local stations,
- means for transporting respective user commands from the local stations to the central station, and respective presentation commands from the central station to the corresponding local stations, and
- the central station further comprises means, responsive to execution of said respective user commands, for generating respective presentation commands in accordance with respective application programs.

19. A system as claimed in claim 14, wherein said means for fetching and utilizing adapt the fetched data responsive solely to said presentation commands.

20. A system as claimed in claim 19, wherein:
- said interactive program is an audiovisual program,
- said local mass memory includes a user-replaceable element having data stored thereon relating to a particular interactive program including a plurality of images, and
- said means for fetching and utilizing includes means for presenting audiovisual data on a local reproduction device.

* * * * *